United States Patent
Hanao et al.

(10) Patent No.: US 11,108,239 B2
(45) Date of Patent: Aug. 31, 2021

(54) POWER SYSTEM AND POWER CONTROL DEVICE

(71) Applicant: DAIHEN Corporation, Osaka (JP)

(72) Inventors: Takafumi Hanao, Osaka (JP); Akihiro Ohori, Osaka (JP)

(73) Assignee: DAIHEN Corporation, Osaka (JP)

( * ) Notice: Subject to any disclaimer, the term of this patent is extended or adjusted under 35 U.S.C. 154(b) by 0 days.

(21) Appl. No.: 16/797,238

(22) Filed: Feb. 21, 2020

(65) Prior Publication Data

US 2020/0295571 A1 Sep. 17, 2020

(30) Foreign Application Priority Data

Mar. 14, 2019 (JP) .............................. JP2019-046657

(51) Int. Cl.
| | |
|---|---|
| *H02J 3/38* | (2006.01) |
| *H02J 3/32* | (2006.01) |
| *H02J 3/46* | (2006.01) |
| *H02J 13/00* | (2006.01) |
| *B60L 53/10* | (2019.01) |
| *B60L 55/00* | (2019.01) |

(52) U.S. Cl.
CPC ............... *H02J 3/381* (2013.01); *H02J 3/32* (2013.01); *H02J 3/46* (2013.01); *H02J 13/00* (2013.01); *B60L 53/10* (2019.02); *B60L 55/00* (2019.02); *H02J 2203/20* (2020.01); *H02J 2300/24* (2020.01)

(58) Field of Classification Search
CPC ...... H02J 3/381; H02J 3/32; H02J 3/46; H02J 13/00
See application file for complete search history.

(56) References Cited

U.S. PATENT DOCUMENTS

| | | | | |
|---|---|---|---|---|
| 2014/0183949 A1* | 7/2014 | Murano | ..................... | G05F 3/02 307/24 |
| 2015/0288189 A1* | 10/2015 | Nakai | ..................... | H02J 3/383 307/26 |
| 2016/0013652 A1* | 1/2016 | Li | ........................... | H02J 9/061 307/24 |
| 2017/0262037 A1* | 9/2017 | Trifonov | ............... | G06F 1/3212 |

FOREIGN PATENT DOCUMENTS

JP 2018-148627 A 9/2018

* cited by examiner

*Primary Examiner* — John W Poos
(74) *Attorney, Agent, or Firm* — Hamre, Schumann, Mueller & Larson, P.C.

(57) ABSTRACT

A power system is provided for controlling a connection point power at a connection point with a power grid D. The power system includes a processing device that calculates a guidance command value for controlling the connection point power to achieve a target power, and a plurality of power control devices that each control the output power of mutually different types of control targets, based on a common guidance command value inputted from the processing device. Each of the plurality of power control devices calculates a target value of the output power, based on an optimization problem including a common evaluation function. The evaluation function includes the guidance command value and a design parameter for which a setting value set for each of the plurality of power control devices is substituted.

3 Claims, 6 Drawing Sheets

|  | Positive guidance command value settings (pr≧0) | | | | | Negative guidance command value settings (pr<0) | | | | |
|---|---|---|---|---|---|---|---|---|---|---|
|  | $sv_{max}$ ($p^{max}$) | $sv_{min}$ ($p^{min}$) | $sv_1$ ($a_1$) | $sv_2$ ($a_2$) | $sv_3$ ($a_3$) | $sv_{max}$ ($p^{max}$) | $sv_{min}$ ($p^{min}$) | $sv_1$ ($a_1$) | $sv_2$ ($a_2$) | $sv_3$ ($a_3$) |
| 11a | 250 | 0 | 1 | 1 | 250 | 250 | 0 | 1 | 1 | 250 |
| 11b | 250 | 0 | 1 | 1 | 500 | 250 | 0 | 1 | 1 | 250 |
| 11c | 250 | 0 | 2 | 1 | 250 | 250 | 0 | 1 | 1 | 250 |
| 11d | 250 | 0 | 2 | 1 | 400 | 250 | 0 | 1 | 1 | 250 |

|  | Positive guidance command value settings (pr≧0) | | | | | Negative guidance command value settings (pr<0) | | | | |
|---|---|---|---|---|---|---|---|---|---|---|
|  | $sv_{max}$ ($p^{max}$) | $sv_{min}$ ($p^{min}$) | $sv_1$ ($a_1$) | $sv_2$ ($a_2$) | $sv_3$ ($a_3$) | $sv_{max}$ ($p^{max}$) | $sv_{min}$ ($p^{min}$) | $sv_1$ ($a_1$) | $sv_2$ ($a_2$) | $sv_3$ ($a_3$) |
| 21a | 0 | −250 | 1 | 0 | 250 | 250 | 0 | 1 | 0 | 250 |
| 21b | 0 | −250 | 1 | 0 | 500 | 250 | 0 | 1 | 0 | 500 |
| 21c | 0 | −250 | 2 | 1 | 250 | 250 | 0 | 2 | −1 | 250 |

| | Positive guidance command value settings (pr≧0) | | | | | Negative guidance command value settings (pr<0) | | | | |
|---|---|---|---|---|---|---|---|---|---|---|
| | $SV_{max}$ ($P^{max}$) | $SV_{min}$ ($P^{min}$) | $SV_1$ ($a_1$) | $SV_2$ ($a_2$) | $SV_3$ ($a_3$) | $SV_{max}$ ($P^{max}$) | $SV_{min}$ ($P^{min}$) | $SV_1$ ($a_1$) | $SV_2$ ($a_2$) | $SV_3$ ($a_3$) |
| 31a | 0 | −10 | 1 | −1 | 10 | 10 | −10 | 2 | −1 | 10 |
| 31b | 0 | −10 | 1 | −1 | 10 | 10 | −10 | 2 | −1 | 20 |
| 31c | 0 | −10 | 1 | −1 | 10 | 10 | −10 | 1.33 | −1 | 30 |

|  | Positive guidance command value settings (pr≧0) | | | | | Negative guidance command value settings (pr<0) | | | | |
| --- | --- | --- | --- | --- | --- | --- | --- | --- | --- | --- |
|  | $sv_{max}$ ($p^{max}$) | $sv_{min}$ ($p^{min}$) | $sv_1$ ($a_1$) | $sv_2$ ($a_2$) | $sv_3$ ($a_3$) | $sv_{max}$ ($p^{max}$) | $sv_{min}$ ($p^{min}$) | $sv_1$ ($a_1$) | $sv_2$ ($a_2$) | $sv_3$ ($a_3$) |
| 41a | 0 | −500 | 1 | −1 | 500 | 0 | −500 | 1 | −1 | 500 |
| 41b | 0 | −500 | 1 | −1 | 400 | 0 | −500 | 1 | −1 | 400 |
| 41c | 0 | −500 | 1 | −1 | 1000 | 100 | −500 | 1.1 | −1 | 1000 |
| 41d | 0 | −500 | 1 | −1 | 750 | 0 | −500 | 1.3 | −1 | 750 |

| | Positive guidance command value settings (pr≧0) | | | | | Negative guidance command value settings (pr<0) | | | | |
|---|---|---|---|---|---|---|---|---|---|---|
| | $SV_{max}$ ($P^{max}$) | $SV_{min}$ ($P^{min}$) | $SV_1$ ($a_1$) | $SV_2$ ($a_2$) | $SV_3$ ($a_3$) | $SV_{max}$ ($P^{max}$) | $SV_{min}$ ($P^{min}$) | $SV_1$ ($a_1$) | $SV_2$ ($a_2$) | $SV_3$ ($a_3$) |
| 51a | 300 | 0 | 1 | 1 | 300 | 300 | 300 | 1 | 1 | 300 |
| 51b | 300 | 0 | 0.85 | 1 | 300 | 300 | 300 | 1 | 1 | 300 |
| 51c | 250 | 0 | 1 | 1 | 500 | 300 | 250 | 2 | −1 | 300 |
| 51d | 300 | 0 | 1 | 1 | 400 | 300 | 300 | 2 | 1 | 400 |

FIG.6B

POWER SYSTEM AND POWER CONTROL DEVICE

FIELD

The present disclosure relates to a power system and a power control device.

BACKGROUND

In recent years, power systems that manage a plurality of power devices connected to a power grid and control power transmission to and power reception from the power grid are becoming increasingly widespread. For example, JP-A-2018-148627 discloses an example of a power system provided with a plurality of power devices and a management device. The management device manages the plurality of power devices. The management device calculates an index for controlling a predetermined power for adjustment to achieve a target power. The plurality of power devices are, for example, a solar power generation device and a power storage device. The power devices control output power dispersively, using the index calculated by the management device. At this time, each power device calculates a target value of output power thereof, based on an optimization problem that uses the index. The power device then controls the output power thereof, such that the output power achieves the target value.

Power devices have diversified, and different types of power devices from solar power generation devices and power storage devices (e.g., charging stands for electric cars, building energy management systems, factory energy management systems, etc.) are increasingly interconnected to power grids. In view of this, energy management that encompasses various types of power devices is sought in power systems.

In light of the above issue, an object of the present disclosure is to provide a power system capable of energy management that responds to diversification of power devices. Also, an object of the disclosure is to provide a power control device that enables energy management responding to diversification of power devices to be realized in a power system.

SUMMARY

According to a first aspect of this disclosure, there is provided a power system for controlling a connection point power at a connection point with a power grid. The power system may include a processing device configured to calculate a guidance command value for controlling the connection point power to achieve a target power, and a plurality of power control devices each configured to control an output power of mutually different types of control targets, based on the guidance command value inputted from the processing device and common to the plurality of power control devices, where each of the plurality of power control devices calculates a target value of the output power, based on an optimization problem including a common evaluation function, and the evaluation function includes the guidance command value and a design parameter for which a setting value set for each of the plurality of power control devices is substituted.

In a preferable embodiment of the power system, the design parameter includes a first parameter, a second parameter, and a third parameter, the first parameter is a parameter for adjusting an amount of change of the output power that depends on a change in the guidance command value, and a first setting value is substituted therefor, the second parameter is a parameter for adjusting the output power in a case where the guidance command value is a value close to 0, and a second setting value is substituted therefor, and the third parameter is a parameter for adjusting the guidance command value at which the output power begins to change, and a third setting value is substituted therefor.

In a preferable embodiment of the power system, the first setting value, the second setting value and the third setting value are each set separately between a case where the guidance command value is a positive value and a case where the guidance command value is a negative value.

In a preferable embodiment of the power system, each of the plurality of power control devices calculates the target value, by computing the following equations (1) and (2) derived from the evaluation function:

$$P^{ref} = \left(-\Lambda \frac{a_1}{a_4} \frac{1}{pr^{lmt}} + a_2\right)a_3 \qquad (1)$$

$$\Lambda = pr - (1-a_4)\frac{a_2}{a_1}pr^{lmt} \qquad (2)$$

where $P^{ref}$ is the target value, pr is the guidance command value, $pr^{lmt}$ is a guidance command value limit which is a value defining a maximum value and a minimum value of the guidance command value pr, $a_1$ is the first parameter, $a_2$ is the second parameter, $a_3$ is the third parameter, and $a_4$ is a parameter that depends on a charging rate of a storage battery.

A power control device provided according to a second aspect of this disclosure is a power control device, in a power system that controls a connection point power at a connection point with a power grid, for receiving input of a guidance command value for controlling the connection point power to achieve a target power, and controlling output power, based on the guidance command value, the power control device calculating a target value of the output power, based on an evaluation function of an optimization problem defined by the following equations (3) and (4):

$$\min_{P^{ref}}\left\{\frac{pr^{lmt}}{2a_3} \cdot \frac{a_4}{a_1}(P^{ref} - a_2a_3)^2 + \Lambda(P^{ref} - a_2a_3)\right\} \qquad (3)$$

$$\Lambda = pr - (1-a_4)\frac{a_2}{a_1}pr^{lmt} \qquad (4)$$

where $P^{ref}$ is the target value, pr is the guidance command value, $pr^{lmt}$ is a guidance command value limit which is a value defining a maximum value and a minimum value of the guidance command value pr, $a_1$, $a_2$ and $a_3$ are design parameters for which a setting value set for each of the power control devices is substituted, and $a_4$ is a parameter that depends on a charging rate of a storage battery.

According to the power system of this disclosure, each of the plurality of power control devices calculates a target value of output power, based on an optimization problem including a common evaluation function. According to this configuration, an evaluation function that corresponds to the type of control target does not need to be considered, even in the case of controlling different types of control targets with a plurality of power control devices. For example, an evaluation function that corresponds to a different control target from a solar cell and a storage battery does not need to be newly considered. Accordingly, the power system of this disclosure is able to respond to diversification of power control devices (power devices). Also, the power control device of this disclosure calculates a target value of output power, based on the evaluation function of the optimization problem that is defined by the above equations (3) and (4). The above equations (3) and (4) do not include design parameters unique to the control target that is controlled by the power control device. According to this configuration, the power control device is able to calculate the target value of output power, based on the above equations (3) and (4), even if the type of control target differs. Accordingly, the power control device enables energy management that responds to diversification of power control devices (power devices) to be realized in a power system.

EMBODIMENTS

Embodiments of a power system and a power control device according to this disclosure will be described below.

Figure 1:
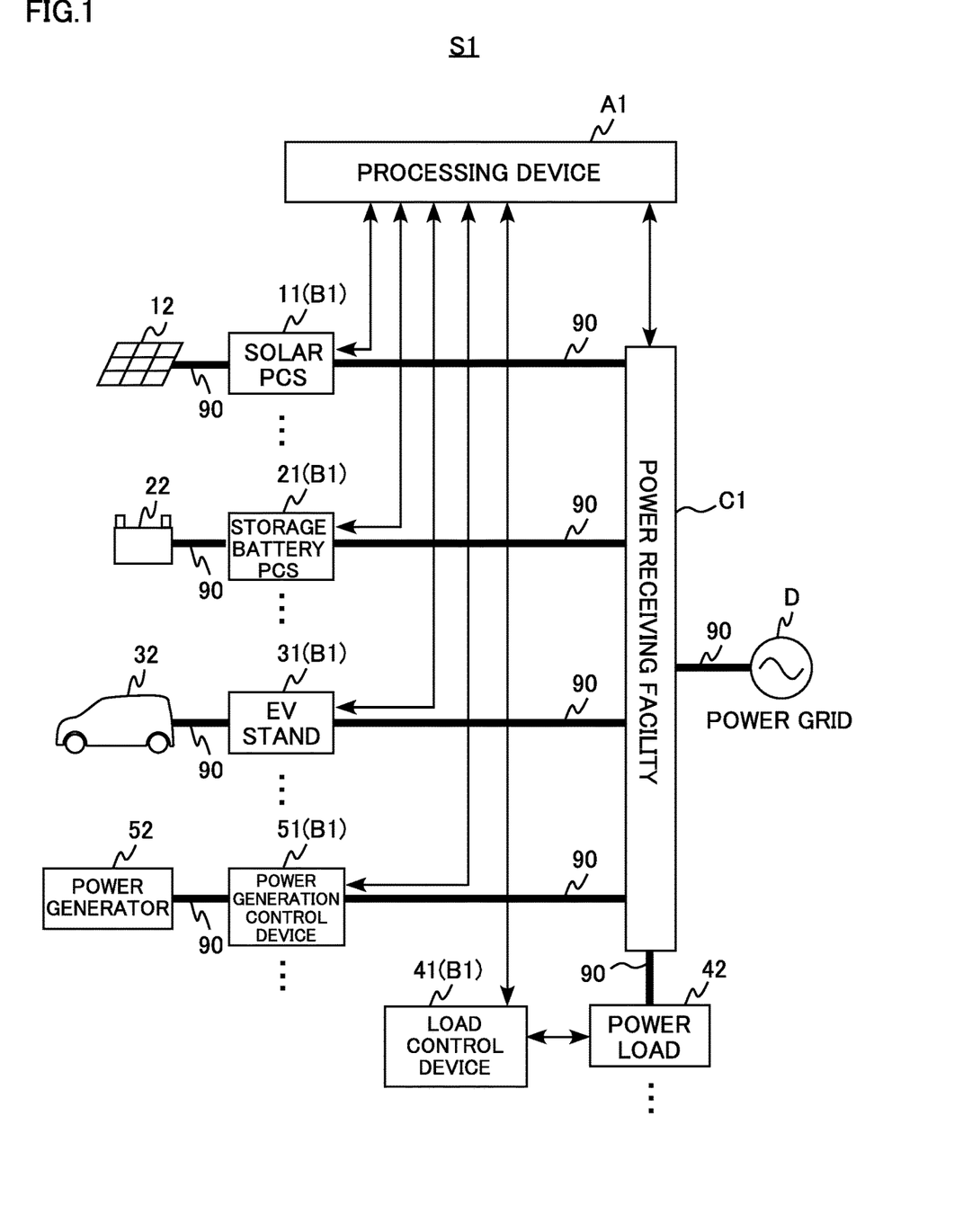
FIG. 1 shows an overall configuration of a power system.

FIG. 1 shows an overall configuration of a power system S1 according to this disclosure. The power system S1, as shown in FIG. 1, is provided with a power line 90, a processing device A1, and a plurality of power control devices B1. The plurality of power control devices B1, as shown in FIG. 1, include a plurality of solar power conditioners 11, a plurality of storage battery power conditioners 21, a plurality of EV stands 31, a plurality of load control devices 41, and a plurality of power generation control devices 51. In the following description and FIG. 1, power conditioner is abbreviated as "PCS".

The power system S1 is interconnected to a power grid D. The power system S1 is capable of transmitting electrical power to the power grid D (reverse load flow is possible), and is capable of receiving electrical power from the power grid D. The power system S1 performs power control, such that electrical power (hereinafter, "connection point power.") at a connection point of the power system S1 and the power grid D will achieve the target value (hereinafter, "target power") of the connection point power, through cooperation of the processing device A1 and the plurality of power control devices B1. In this disclosure, when electrical power is output from the power system S1 to the power grid D, that is, when there is reverse load flow, the connection point power will be given as a positive value. On the other hand, when electrical power is output from the power grid D to the power system S1, the connection point power will be given as a negative value.

The power control that is performed by the power system S1 includes, for example, output suppression control, peak cut control, reverse load flow avoidance control, and schedule control. Output suppression control involves suppressing electrical power that is output from the power system S1 to the power grid D (sold power), in accordance with an output suppression command given by a power utility. Peak cut control involves suppressing a peak value of electrical power that is supplied from the power grid D (purchased power). Reverse load flow avoidance control involves suppressing the occurrence of reverse load flow. Schedule control involves controlling the output power of the power system S1 to achieve a power value set by the user. The power system S1 performs one of these power controls, according to a control mode that is set for the processing device A1.

The power line 90 constructs a power network in the power system S1. The power system S1 is connected to the power grid D by the power line 90.

The processing device A1 performs power control of the power system S1 in cooperation with the plurality of power control devices B1. The processing device A1 is capable of communicating with each of the power control devices B1. This communication may be wireless communication or may be wired communication.

The plurality of solar PCSs 11 are each connected to a solar cell 12, and function to convert electrical power (e.g., direct current power) generated by the solar cell 12 into electrical power (e.g., alternating current power) suitable for grid interconnection and output the resultant power. Each solar PCS 11 may have one solar cell 12 connected thereto or may have a plurality of solar cells 12 connected thereon. The solar PCSs 11 are connected to a power receiving facility C1 by the power line 90. The solar PCSs 11 output electrical power generated by the solar cells 12 to the power receiving facility C1. The solar PCSs 11 control the output power of the control target (solar cells 12), by controlling the amount of power generation of the solar cells 12.

The plurality of storage battery PCSs 21 are each connected to a storage battery 22, and charge and discharge the storage battery 22. Each storage battery PCS 21 may have one storage battery 22 connected thereto or may have a plurality of storage batteries 22 connected thereto. The storage batteries 22 may be a secondary battery such as a lithium-ion battery, a nickel-hydrogen battery, a nickel-cadmium battery or a lead storage battery, or may be a capacitor such as an electric double layer capacitor, for example. The storage battery PCSs 21 are connected to the power receiving facility C1 by the power line 90. The storage battery PCSs 21 charge the storage batteries 22, by supplying electrical power that is input from the power receiving facility C1 to the storage batteries 22. Also, the storage battery PCSs 21 discharge the storage batteries 22, by outputting electrical power stored in the storage batteries 22 to the electrical power receiving facility C1. The storage battery PCSs 21 control the output power of the control target (storage batteries 22), by controlling the charge amount and discharge amount of the storage batteries 22.

The plurality of EV stands 31 are each connected to an electric car 32, and charge and discharge the electric car 32 (specifically, charge and discharge a storage battery provided in the electric car 32). Each EV stand 31 may have one electric car 32 connected thereto or may have a plurality of electric cars 32 connected thereto. The electric car 32 according to this disclosure is a car capable of traveling with an electric motor as a power source, and includes cars (e.g., plug-in hybrid cars) that are also fitted with an internal combustion engine. Note that the electric motor is powered by electricity stored in the storage battery provided in the electric car 32. The electric car 32 may have an energy regeneration system installed. The EV stands 31 are connected to the power receiving facility C1 by the power line 90. The EV stands 31 charge the electric cars 32, by supplying electrical power that is input from the power receiving facility C1 to the electric cars 32. Also, the EV stands 31 discharge the electric cars 32, by outputting electrical power stored in the electric cars 32 to the power receiving facility C1. The EV stands 31 control the output power of the control target (electric cars 32), by controlling the charge amount and discharge amount of the electric cars 32. Note that a configuration may be adopted in which each EV stand 31 only charges or only discharges the electric cars 32, rather than charging and discharging the electric cars 32.

The plurality of load control devices 41 each control a power load 42 connected to the power receiving facility C1. The load control devices 41 are building energy management systems (BEMS), factory energy management systems (FEMS) and the like, for example. The plurality of load control devices 41 may each control one power load 42, or may each control a plurality of power loads 42. The load control devices 41 monitor the power consumption of the power loads 42, and adjusts the power consumption of the power loads 42. Adjustment of the power consumption of the power loads 42 that is performed by the load control devices 41 includes, for example, turning the power loads 42 on and off, changing the air volume and set temperature if the power load 42 is an air conditioner, and performing dimming control if the power load 42 is a light fitting. The power loads 42 may be provided with a power generation mechanism that stores energy other than electrical energy (e.g., thermal energy, etc.) that occurs when electrical power is consumed, and converts the stored energy into electrical energy. In this case, the power loads 42 are capable of outputting electrical power generated by the power generation mechanism to the power receiving facility C1. The load control devices 41 control the output power of the control target (power loads 42), by controlling the power consumption of the power loads 42.

The plurality of power generation control devices 51 are each connected to a power generator 52, and function to convert electrical power generated by the power generator 52 to electrical power suitable for grid interconnection and output the resultant power. Each power generation control device 51 may have one power generator 52 connected thereto or may have a plurality of power generators 52 connected thereto. The power generator 52 converts thermal energy possessed by a fuel such as oil, coal or gas, for example, into mechanical energy, and generates electrical power with this mechanical energy. Note that the power generator 52 may be a power generation device that utilizes renewable energy other than solar energy (e.g., wind power, hydropower, bioenergy, geothermal energy, etc.). Whereas the solar cell 12 converts solar energy directly into electrical energy, the power generator 52 converts the energy other than electrical energy into dynamic energy, and thereafter converts the dynamic energy into electrical energy. The power generation control devices 51 are connected to the power receiving facility C1 by the power line 90. The power generation control devices 51 output electrical power generated by the power generator 52 to the power receiving facility C1. The power generation control devices 51 control the output power of the control target (power generators 52), by controlling the amount of power generation of the power generators 52.

In this embodiment, the case is shown where the types of control targets that are controlled by the plurality of power control devices B1 include the solar cell 12 that is controlled by the solar PCS 11, the storage battery 22 that is controlled by the storage battery PCS 21, the electric car 32 that is controlled by the EV stand 31, the power load 42 that is controlled by the load control device 41, and the power generator 52 that is controlled by the power generation control device 51, but the present invention is not limited thereto. For example, the power system S1 need only be provided with at least one or more of these five types. Also, the types of control targets are not limited to the abovementioned five types.

The power receiving facility C1 is constituted to include a switchboard or a distribution board. The power receiving facility C1 also includes various protection devices for interconnecting the power system S1 to the power grid D. For example, in the case where the power system S1 is a system in which reverse load flow to the power grid D is prohibited, a reverse power relay is included as a protection device. The power receiving facility C1 receives electrical power that is input via the power line 90 from the power grid D, the power control devices B1 (excluding the plurality of load control devices 41), and the power loads 42. The power receiving facility C1 supplies received electrical power to the power grid D, the power control devices B1 (excluding the plurality of load control devices 41), the power loads 42, and the like. The power receiving facility C1 includes a power sensor (illustration omitted) installed at the connection point between the power system S1 and the power grid D, and detects the connection point power with this power sensor. The power receiving facility C1 transmits the detection value of the connection point power to the processing device A1.

In the power system S1 constituted as described above, the processing device A1 monitors the connection point power, and calculates a guidance command value for controlling the connection point power to achieve the target power. A detection value that is received from the power receiving facility C1 or an estimation value that is calculated from the value of respective output power acquired through communication from the power control devices B1 may be used as the connection point power. A value that depends on the set control mode is set as the target power. The processing device A1 transmits the calculated guidance command value to the power control devices B1. On the other hand, the power control devices B1 receive the guidance command value transmitted from the processing device A1. The power control devices B1 calculate the target value of output power (hereinafter, "output target value") of the control target, based on an optimization problem set in advance, using the received guidance command value. The power control devices B1 then control output power of the control target, such that the output power achieves the calculated output target value. The power system S1 thereby performs power control, such that the connection point power achieves the target power. In this embodiment, the connection point power is smaller as the guidance command value that is calculated by the processing device A1 increases, and the connection point power is larger as the guidance command value-decreases. The guidance command value is also for each power control device B1 to calculate the output target value.

In the processing device A1, state equations (simultaneous differential equations) shown in the following equations (5) and (6) are set, and the guidance command value is calculated, by computing these state equations. The processing device A1 calculates the guidance command value every predetermined time period (e.g., 1 sec). In the following equations (5) and (6), P(t) is the connection point power, $P^c(t)$ is the target power, $\lambda(t)$ is a state variable, and pr(t) is the guidance command value. Also, [A] is a matrix of state coefficients, [B] is a matrix of input coefficients, [C] is a matrix of output coefficients, and [D] is a matrix of direct coefficients, and these coefficient matrices [A], [B], [C] and [D] are defined by the following equation (7). In the following equation (7), R is a set of real numbers, and p, q and r are natural numbers. The state equations shown in following equations (5) and (6) and set for the processing device A1 are obtained by converting a predetermined transfer function into a state-space representation, and the coefficient matrices [A], [B], [C] and [D] are determined according to this transfer function.

$$\frac{d}{dt}\lambda(t) = [A]\lambda(t) + [B](P(t) - P^C(t)) \quad (5)$$

$$pr(t) = [C]\lambda(t) + [D](P(t) - P^C(t)) \quad (6)$$

$$\left.\begin{array}{l}[A] \in R^{p \times p}, [B] \in R^{p \times q}, [C] \in R^{r \times p} [D] \in R^{r \times q} \\ \lambda(t) \in R^p, (P(t) - P^C(t)) \in R^q, pr(t) \in R^r\end{array}\right\} \quad (7)$$

The processing device A1 calculates the guidance command value pr(t), by solving the state equations shown in the following equations (9) and (10), when the coefficient matrices [A], [B], [C] and [D] are the following equations (8), for example. ε is a slope coefficient.

$$[A] = \begin{bmatrix} 0 & 1 \\ 0 & 0 \end{bmatrix}, [B] = \begin{bmatrix} 0 \\ \varepsilon \end{bmatrix}, [C] = [1 \ 0], [D] = 0 \quad (8)$$

$$\frac{d}{dt}\lambda = \varepsilon(Pc(t) - Pt(t)) \quad (9)$$

$$pr(t) = \lambda \quad (10)$$

The processing device A1 may, instead of using the state equations shown in the above equations (5) and (6), use difference equations obtained by discretizing these state equations. The difference equations in this case are represented by the following equations (11) and (12), with the state variable to be derived as λ(k), the guidance command value to be derived as pr(k), the state variable calculated last time as λ(k−1), and the calculation cycle of the guidance command value pr(k) as Ts. Note that, in the following equations (11) and (12), difference equations using backward differences are shown, but forward differences or central differences may be used instead of backward differences.

$$\lambda(k)=\lambda(k-1)+Ts([A]\lambda(k-1)+[B](P(k-1)-P^c(k-1))) \quad (11)$$

$$pr(k)=\lambda(k-1)+Ts([C]\lambda(k-1)+[D](P(k-1)-P^c(k-1))) \quad (12)$$

The power control devices B1 calculate an output target value, based on an optimization problem that uses the guidance command value. This optimization problem includes an evaluation function and constraint conditions.

The evaluation function includes the guidance command value, and is common to the power control devices B1. In other words, the evaluation function is common to the solar PCSs 11, the storage battery PCSs 21, the EV stands 31, the load control devices 41, and the power generation control devices 51. The evaluation function is shown by the following equations (13) and (14), for example. In the following equations (13) and (14), $P^{ref}$ is an output target value of the power control devices B1, pr is a guidance command value, $pr^{lmt}$ is a guidance command value limit, $a_1$ is a first parameter, $a_2$ is a second parameter, $a_3$ is a third parameter, and $a_4$ is a fourth parameter. The guidance command value limit $pr^{lmt}$ is a value that defines the maximum value and minimum value of the guidance command value pr that is used in the power system S1. The value λ that is calculated by the following equation (14) is restricted to a value between the minimum value ($-pr^{lmt}$) of the guidance command value pr and the maximum value ($pr^{lmt}$) of the guidance command value pr. The first parameter $a_1$ is a parameter mainly for adjusting the amount of change in output power that depends on the change in the guidance command value pr. The second parameter $a_2$ is a parameter mainly for adjusting the output power where the guidance command value pr is close to 0. The third parameter $a_3$ is a parameter mainly for adjusting the guidance command value pr at which the output power starts to change. The fourth parameter $a_4$ is a parameter that depends on the charge rate (SoC: State of Charge) of the storage battery that is connected. Setting values set for each power control device B1 are substituted for these design parameters $a_1$ to $a_4$.

$$\min_{P^{ref}}\left\{\frac{pr^{lmt}}{2a_3}\cdot\frac{a_4}{a_1}(P^{ref}-a_2a_3)^2 + \Lambda(P^{ref}-a_2a_3)\right\} \quad (13)$$

$$\Lambda = pr - (1-a_4)\frac{a_2}{a_1}pr^{lmt} \quad (14)$$

The constraint conditions differ according to the type of control target that is controlled by each power control device B1. In other words, the constraint conditions differ according to the solar cell 12 that is controlled by the solar PCS 11, the storage battery 22 that is controlled by the storage battery PCS 21, the electric car 32 that is controlled by the EV stand 31, the power load 42 that is controlled by the load control device 41, and the power generator 52 that is controlled by the power generation control device 51. The constraint conditions that are set for the power control devices B1 include at least an output restriction constraint and an output current constraint (or rated capacity constraint), regardless of the type of control target. For example, the constraint conditions that are set for the solar PCS 11 are shown by the following equations (15), and the constraint conditions set that are for the storage battery PCS 21 are shown by the following equations (16).

$$\left.\begin{array}{l}P_{11}^{min} < P^{ref} < P_{11}^{max} \quad (15a) \\ P^{ref2} + Q_{11}^2 \le \left(S_{11}^d \frac{V_{11}}{V_0}\right)^2 \quad (15b)\end{array}\right\} \quad (15)$$

$$\left.\begin{array}{l}P_{21}^{min} < P^{ref} < P_{21}^{max} \quad (16a) \\ P_{SM}^{lmt} < P^{ref} < P_{SP}^{lmt} \quad (16b) \\ \alpha < P^{ref} < \beta \quad (16c) \\ P^{ref2} + Q_{21}^2 \le \left(S_{21}^d \frac{V_{21}}{V_0}\right)^2 \quad (16d)\end{array}\right\} \quad (16)$$

In the above equations (15), equation (15a) is a constraint (output restriction constraint) on the maximum value of output power that is restricted by a maximum output value $p_{11}^{max}$ and the minimum value of output power that is restricted by a minimum output value $p_{11}^{min}$. A maximum output setting value $sv_{max}$ (discussed later) and a minimum output setting value $sv_{min}$ (discussed later) set for each solar PCS 11 are substituted for the maximum output value $P_{11}^{max}$ and the minimum output value $P_{11}^{min}$. Equation (15b) is a constraint (output current constraint) on the output current of each solar PCS 11, with $Q_{11}$ representing a reactive power of each solar PCS 11, $S_{11}{}^d$ representing a maximum apparent power capable of being output by each solar PCS 11, $V_0$ representing a reference voltage of the connection point at design time, and $V_{11}$ representing an output voltage of each solar PCS 11. Note that a constraint (rated capacity constraint) on the rated capacity of each solar PCS 11 shown in the following equation (15b') may be used, instead of the output current constraint shown in the above equation (15b).

$$P^{ref^2} + Q_{11}{}^2 \le S_{11}{}^{d^2} \qquad (15b')$$

In the above equations (16), equation (16a) is a constraint (output restriction constraint) on the maximum value of output power that is restricted by a maximum output value $P_{21}{}^{max}$ and the minimum value of output power that is restricted by a minimum output value $P_{21}{}^{min}$. A maximum output setting value $sv_{max}$ (discussed later) and a minimum output setting value $sv_{min}$ (discussed later) set for each storage battery PCS 21 are substituted for the maximum output value $P_{21}{}^{max}$ and the minimum output value $P_{21}{}^{min}$. Equation (16b) is a constraint (C rate constraint) on the C rate of each storage battery 22, with $P_{SM}{}^{lmt}$ representing a rated charge output of each storage battery 22, and $P_{SP}{}^{lmt}$ representing a rated discharge output of each storage battery 22. Equation (16c) is a constraint (storage battery SoC constraint) on the SoC of each storage battery PCS 21, with α and β representing adjustable parameters that can be adjusted depending on the remaining amount of each storage battery 22. For example, by setting α to 0 and β to $P_{21}{}^{lmt}$ when the SoC of the storage battery 22 is 90% or more, a restriction can be applied such that only discharging is performed according to the above equation (16c). Also, by setting α to $-P_{21}{}^{lmt}$ and β to 0 when the SoC of the storage battery 22 is 10% or less, a restriction can be applied such that only charging is performed according to the above equation (16c). Furthermore, by setting α to $-P_{21}{}^{lmt}$ and β to $P_{21}{}^{lmt}$ when the SoC of each storage battery 22 is therebetween (more than 10% and less than 90%), a restriction can be applied such that both charging and discharging are performed. Equation (16d) is a constraint (output current constraint) on the output current of the storage battery PCS 21, with $Q_{21}$ representing a reactive power of the storage battery PCS 21, $S_{21}{}^d$ representing a maximum apparent power capable of being output by the storage battery PCS 21, $V_0$ representing a reference voltage of the connection point at design time, and $V_{21}$ representing an output voltage of the storage battery PCS 21. Note that a constraint (rated capacity constraint) on the rated capacity of each storage battery PCS 21 that is shown in the following equation (16d') may be used, instead of the output current constraint shown in the above equation (16d).

$$P^{ref^2} + Q_{21}{}^2 \le S_{21}{}^{d^2} \qquad (16d')$$

Computational equations shown by the following equations (17) and (18) that are derived from the evaluation function shown by the above equations (13) and (14) are set, and the power control devices B1 calculate the output target value with these computational equations. Note that the evaluation function shown in the above equations (13) and (14) may be set, rather than the computational equations shown by the following equations (17) and (18), and the power control devices B1 may calculate an output target value $P^{ref}$ by solving this evaluation function (solving the minimization problem).

$$P^{ref} = \left( -\Lambda \frac{a_1}{a_4} \frac{1}{pr^{lmt}} + a_2 \right) a_3 \qquad (17)$$

$$\Lambda = pr - (1 - a_4) \frac{a_2}{a_1} pr^{lmt} \qquad (18)$$

Each power control device B1, in the case where the output target value $P^{ref}$ calculated with the computational equations shown by the above equations (17) and (18) does not meet a constraint condition (refer to the above equations (15) or (16)) that is set for the power control device B1, corrects the output target value, so as to meet the constraint condition. For example, in each solar PCS 11, in the case where the output target value $P^{ref}$ calculated with the above equations (17) and (18) is larger than the maximum output value $p_{11}{}^{max}$, the output target value $P^{ref}$ is corrected to the value of the maximum output value $P_{11}{}^{max}$.

In order to calculate the output target value $P^{ref}$, a plurality of setting values are set for each power control device B1. In this embodiment, these include a maximum output setting value $sv_{max}$, a minimum output setting value $sv_{min}$, a first setting value $sv_1$, a second setting value $sv_2$, a third setting value $sv_3$, and a fourth setting value $sv_4$. The maximum output setting value $sv_{max}$ is a setting value defining the maximum output value $P^{max}$, and is set to a value not greater than the rated output that is defined for each power control device B1. The minimum output setting value $sv_{min}$ is a setting value defining the minimum output value $P^{min}$, and is set to a value not less than the rated output that is defined for each power control device B1. The first setting value $sv_1$ is a setting value of the value that is substituted for the first parameter $a_1$. The first setting value $sv_1$ can be any value, and, when the connection point power at the time of reverse load flow is a positive value, a value greater than or equal to 0 is set. The second setting value $sv_2$ is a setting value of the value that is substituted for the second parameter $a_2$. The second setting value $sv_2$ is set to one of +1, 0 and −1. When the second setting value $sv_2$ is +1, the guidance command value pr will be a value close to 0 and the output target value $P^{ref}$ will be a positive value, when the second setting value $sv_2$ is −1, the guidance command value pr will be a value close to 0 and the output target value $P^{ref}$ will be a negative value, and when the second setting value $sv_2$ is 0, the guidance command value pr will be a value close to 0 and the output target value $P^{ref}$ will be 0. The third setting value $sv_3$ is a setting value of the value that is substituted for the third parameter $a_3$. The third setting value can be set to any value. The fourth setting value $sv_4$ is a setting value of the value that is substituted for the fourth parameter $a_4$. The fourth setting value $sv_4$ is set as follows. A fixed value "1" is set for the solar PCSs 11, the load control devices 41 and the power generation control devices 51, since a storage battery is not connected, and the computed value of the following equation (19) is set for the storage battery PCSs 21 and the EV stands 31. With regard to the following equation (19), $\omega_{SoC}$ is calculated by the following equation (20), and the smaller value calculated by the following equations (21) and (22) is used as $\omega_{SoC\_tmp}$. In the following equations (20) to (22), $A_{SoC}$ indicates an offset of a weight $w_{SoC}$, $K_{SoC}$ indicates a gain of the weight $w_{SoC}$, $s_{sw}$ indicates an on/off switch of the weight $w_{SoC}$ (e.g., 1 when on, 0 when off), $SoC_p$ indicates the current SoC of each storage battery 22, and $SoC_d$ indicates an SoC serving as a reference. These setting values can each be set separately between the cases where the guidance command value that is received is a positive value and a negative value. In the following description, settings that correspond to when the guidance command value is a positive value (includes 0), will be referred to as "positive guidance command value settings", and settings that correspond to when the guidance command value is a negative value will be referred to as "negative guidance command value settings".

$$a_4 = \frac{\omega_{SoC}}{\omega_{SoC\_tmp}} \quad (19)$$

$$\omega_{SoC} = \begin{cases} A_{SoC} + s_{SW}\dfrac{SoC_p - SoC_d}{K_{Soc}} & \left(pr \le \dfrac{a_2}{a_1}pr^{bmt}\right) \\ A_{SoC} - s_{SW}\dfrac{SoC_p - SoC_d}{K_{Soc}} & \left(pr > \dfrac{a_2}{a_1}pr^{bmt}\right) \end{cases} \quad (20)$$

$$\omega_{SoC\_tmp} = A_{SoC} + s_{SW}\frac{100 - SoC_d}{K_{Soc}} \quad (21)$$

$$\omega_{SoC\_tmp} = A_{SoC} - s_{SW}\frac{0 - SoC_d}{K_{Soc}} \quad (22)$$

Figure 2A:
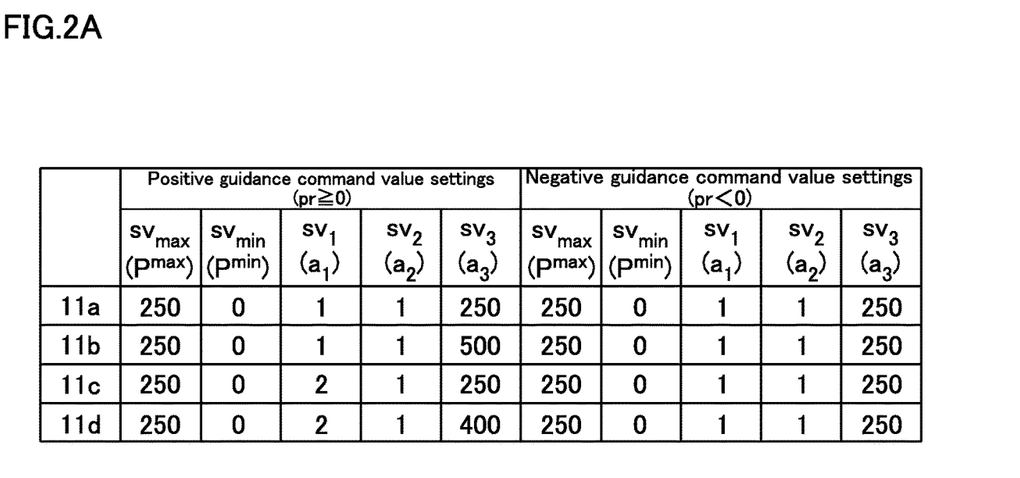
FIGS. 2A and 2B illustrate the settings of solar power conditioners.
Figure 2B:
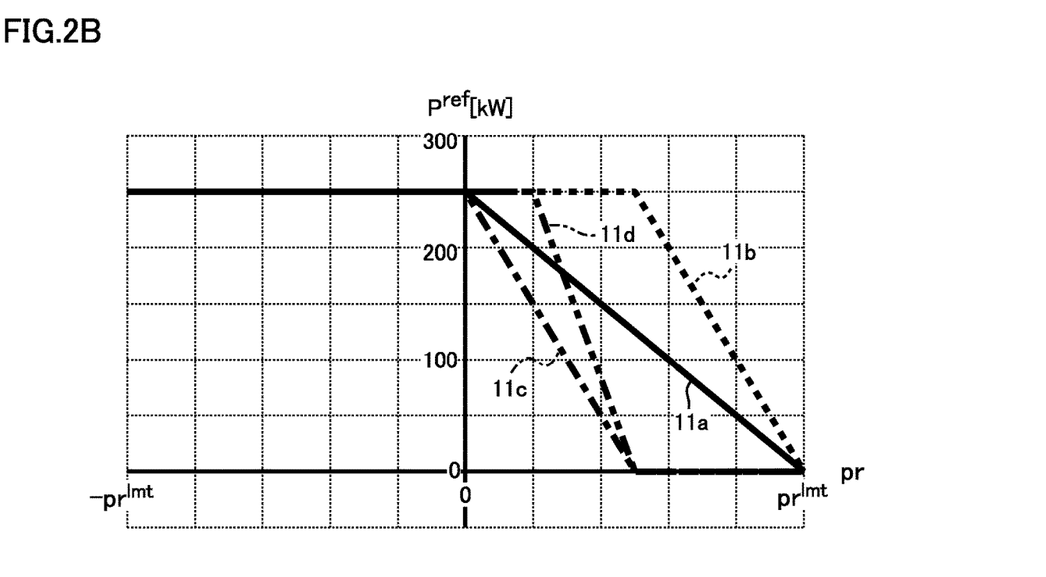
Figure 3A:
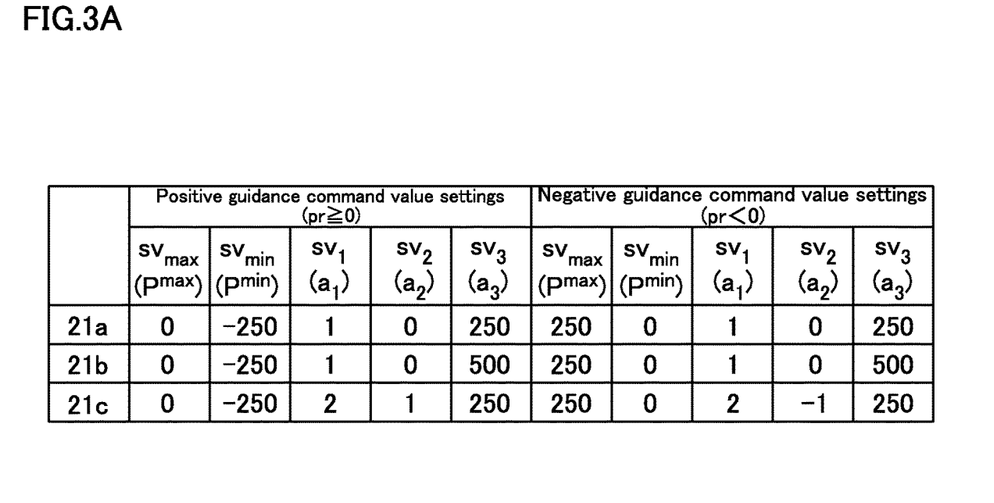
FIGS. 3A and 3B illustrate the settings of storage battery power conditioners.
Figure 3B:
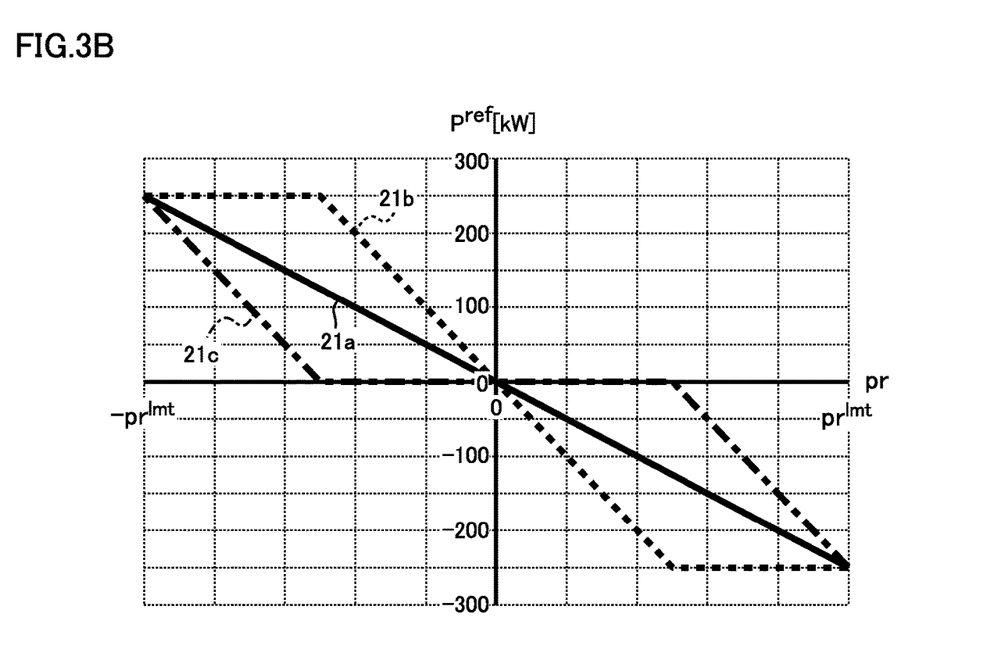
Figure 4A:
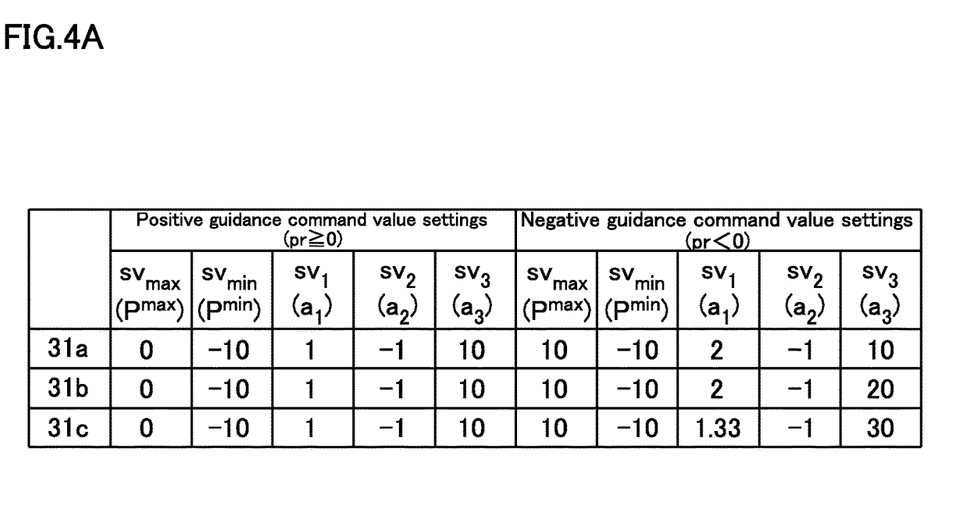
FIGS. 4A and 4B illustrate the settings of EV stands.
Figure 4B:
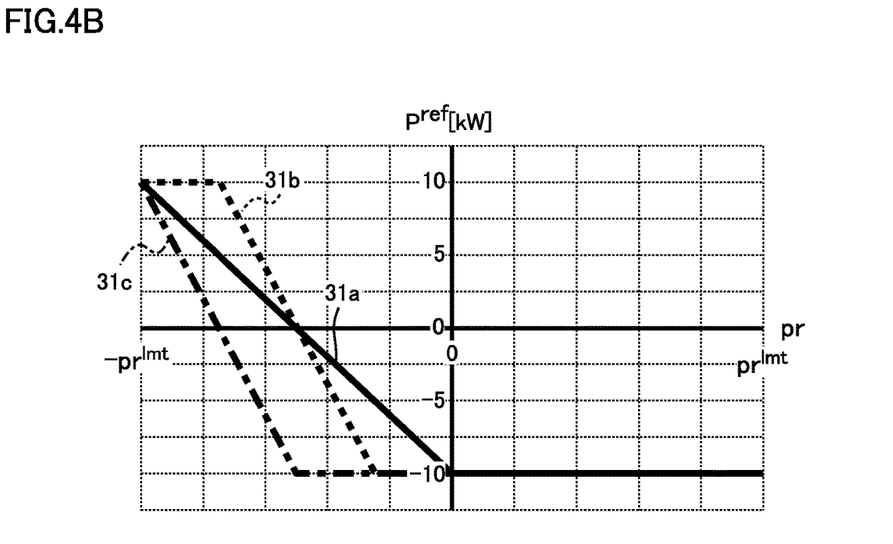
Figure 5A:
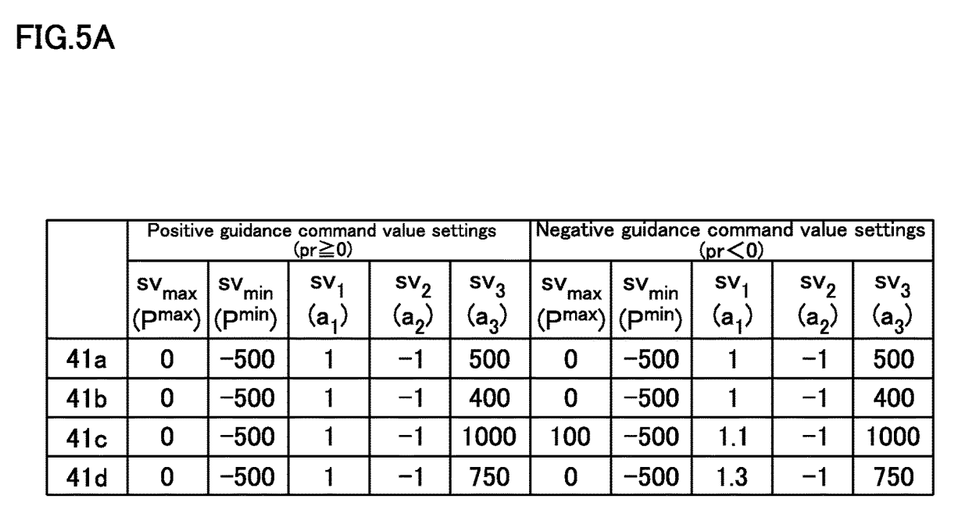
FIGS. 5A and 5B illustrate the settings of load control devices.
Figure 5B:
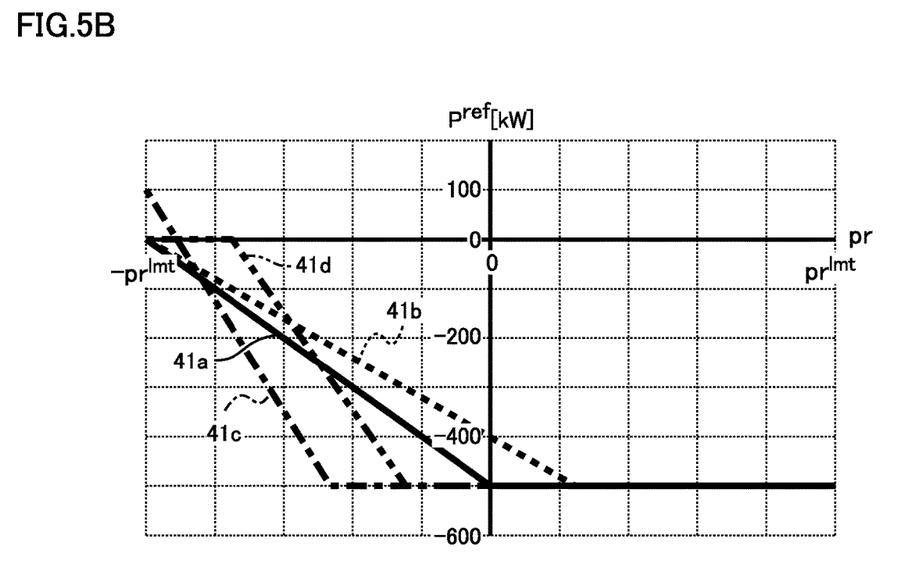
Figure 6A:
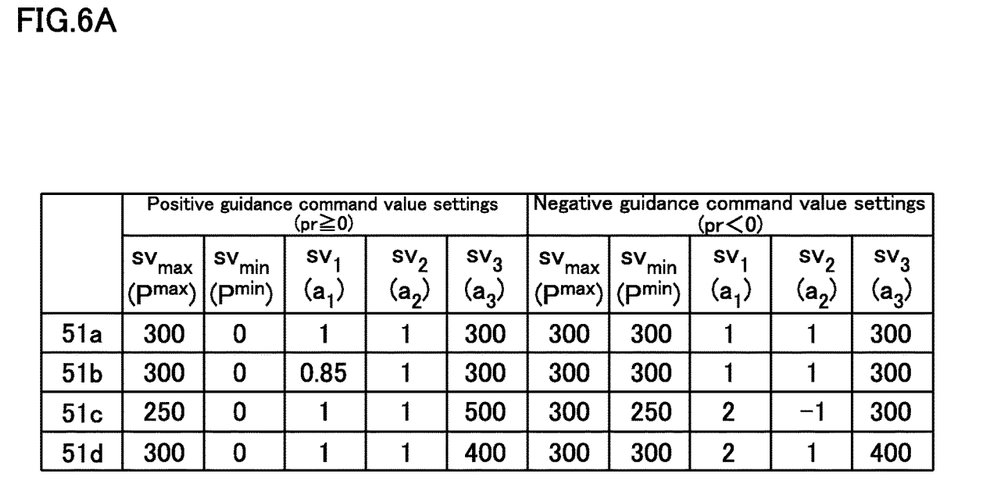
FIGS. 6A and 6B illustrate the settings of power generation control devices.
Figure 6B:
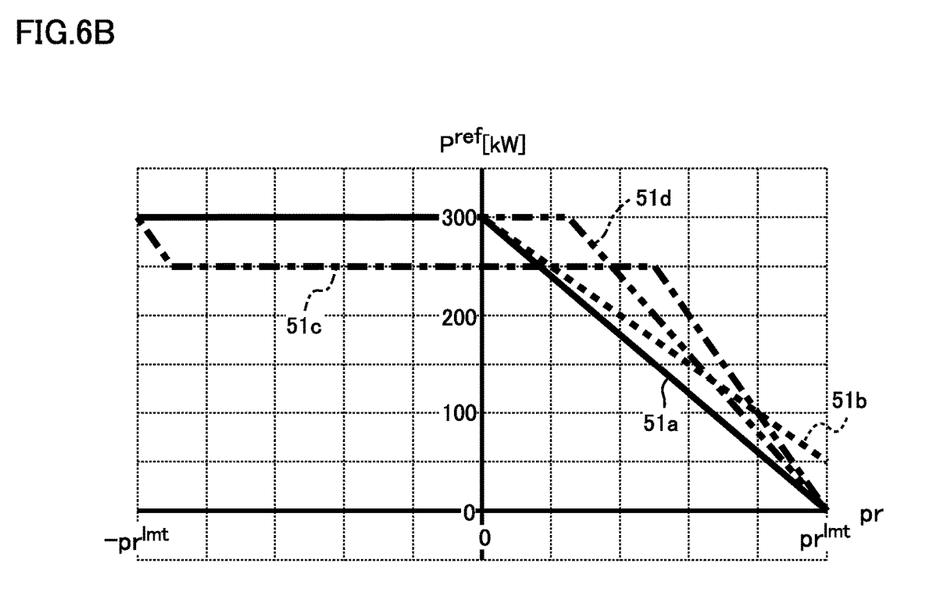

FIGS. 2 to 6 show examples of setting values set for the power control devices B1, and the relationship between the guidance command value pr and the output target value $P^{ref}$ in the power control devices B1. FIGS. 2A to 6A are example settings of the maximum output setting value $sv_{max}$, the minimum output setting value $sv_{min}$, the first setting value $sv_1$, the second setting value $sv_2$, and the third setting value $sv_3$. Note that the fourth setting values $sv_4$ are all set to 1, irrespective of the power control device B1. In the storage battery PCSs 21 and the EV stands 31, the fourth setting value $sv_4$ is set to 1, by setting $s_{sw}$ in the above equations (20) to (22) to 0, for example. FIGS. 2B to 6B show change characteristics of the output target value $P^{ref}$ relative to the guidance command value pr in the setting values shown in FIGS. 2A to 6A. Note that, in FIGS. 2B to 6B, the guidance command value pr is plotted on the horizontal axis, and the output target value $P^{ref}$ is plotted on the vertical axis. FIG. 2 shows example settings in four solar PCSs 11. The four solar PCSs 11 are individually distinguished as solar PCSs 11a, 11b, 11c and 11d. FIG. 3 shows example settings in three storage battery PCSs 21. The three storage battery PCSs 21 are individually distinguished as storage battery PCSs 21a, 21b, and 21c. FIG. 4 shows example settings in three EV stands 31. The three EV stands 31 are individually distinguished as EV stands 31a, 31b, and 31c. FIG. 5 shows example settings in four load control devices 41. The four load control devices 41 are individually distinguished as load control devices 41a, 41b, 41c, and 41d. FIG. 6 shows example settings in four power generation control devices 51. The four power generation control devices 51 are individually distinguished as power generation control devices 51a, 51b, 51c, and 51d.

In the solar PCSs 11a to 11d, as shown in FIG. 2A, the second setting values $sv_2$ of the positive guidance command value settings and the negative guidance command value settings are set to the fixed value "1". As a result of this setting, in the solar PCSs 11a to 11d, as shown in FIG. 2B, the output target value $P^{ref}$ takes a positive value, when the guidance command value pr is 0. In other words, the solar PCSs 11a to 11d output electrical power generated by the solar cell 12 to the power receiving facility C1, when the guidance command value pr is 0. Also, in the solar PCSs 11a to 11d, the setting values of the negative guidance command value settings are set as shown in FIG. 2A. As a result of this setting, in the solar PCSs 11a to 11d, as shown in FIG. 2B, the output target value $P^{ref}$ takes the maximum output setting value $sv_{max}$, when the guidance command value pr is a negative value. In other words, in the solar PCSs 11a to 11d, the maximum outputtable power is output to the receiving facility C1, when the guidance command value pr is a negative value. In particular, in the case where the maximum output setting value $sv_{max}$ that can be set is the same value as the rated output values of the solar PCSs 11a to 11d, the solar PCSs 11a to 11d perform maximum power point tracking control. Furthermore, in the solar PCSs 11a to 11d, as shown in FIG. 2A, the minimum output setting values $sv_{min}$ of the positive guidance command value settings and the negative guidance command value settings are set to 0. As a result of this setting, the output target value $P^{ref}$ will not take a negative value, irrespective of the guidance command value pr that is received. In other words, the solar PCSs 11a to 11d do not receive electrical power from the power receiving facility C1, and do not supply electrical power to the solar cell 12.

In the storage battery PCSs 21a to 21c, as shown in FIG. 3A, the maximum output setting value $sv_{max}$ of the positive guidance command value settings is set to the fixed value "0", and the minimum output setting value $sv_{min}$ of the negative guidance command value settings is set to the fixed value "0". As a result of this setting, in the storage battery PCSs 21a to 21c, as shown in FIG. 3B, the output target value $P^{ref}$ does not exceed 0, when the guidance command value pr is a positive value, and the output target value $P^{ref}$ does not fall below 0, when the guidance command value pr is a negative value. In other words, the storage battery PCSs 21a to 21c constantly receive electrical power from the power receiving facility C1 and charge the storage battery 22, when the guidance command value pr is a positive value, and constantly discharge the storage battery 22 and transmit electrical power to the power receiving facility C1, when the guidance command value pr is a negative value. Also, in the storage battery PCS 21c, as shown in FIG. 3A, the second setting value $sv_2$ of the positive guidance command value settings is set to 1, and the maximum output setting value $sv_{max}$ of the positive guidance command value settings is set to 0. Additionally, the second setting value $sv_2$ of the negative guidance command value settings is set to −1, and the minimum output setting value $sv_{min}$ of the negative guidance command value settings is set to 0. As a result of these settings, in the storage battery PCS 21c, as shown in FIG. 3B, the output target value $P^{ref}$ will also be 0 when the guidance command value pr is not 0. In other words, the storage battery PCS 21c is set so as to avoid charging and discharging the storage battery 22 as much as possible.

In the EV stands 31a to 31c, as shown in FIG. 4A, the second setting values $sv_2$ of the positive guidance command value settings and the negative guidance command value settings are set to the fixed value "−1". As a result of this setting, in the EV stands 31a to 31c, as shown in FIG. 4B, the output target value $P^{ref}$ takes a negative value, when the guidance command value pr is 0. In other words, the EV stands 31a to 31c receive electrical power from the power receiving facility C1 and charge the electric car 32, when the guidance command value pr is 0. Also, in the EV stands 31a to 31c, the setting values of the positive guidance command value settings are set as shown in FIG. 4A. As a result of this setting, in the EV stands 31a to 31c, as shown in FIG. 4B, the output target value $P^{ref}$ takes the minimum output value $P^{min}$, when the guidance command value pr is a positive value. In other words, the EV stands 31a to 31c receive electrical power of the minimum output value $P^{min}$ that is set from the power receiving facility C1, when the guidance command value pr is a positive value.

In the load control devices 41a to 41d, as shown in FIG. 5A, the second setting values $sv_2$ of the positive guidance command value settings and the negative guidance command value settings are set to the fixed value "−1". As a result of this setting, in the load control devices 41a to 41d, as shown in FIG. 5B, the output target value $P^{ref}$ takes a negative value, when the guidance command value pr is 0. In other words, the load control devices 41a to 41d cause the power load 42 to receive electrical power from the power receiving facility C1, when the guidance command value pr is 0. Also, in the load control devices 41a to 41d, the setting values of the positive guidance command value settings are set as shown in FIG. 5A. As a result of this setting, in the load control devices 41a to 41d, as shown in FIG. 5B, the output target value $P^{ref}$, as a general rule, takes the minimum output value $P^{min}$, when the guidance command value pr is a positive value. Depending on the third setting value $sv_3$ of the negative guidance command value settings, however, the output target value $P^{ref}$ may not always take the minimum output value $P^{min}$, as with the load control device 41b. Furthermore, in the load control devices 41a to 41d, as shown in FIG. 5A, the maximum output setting values $sv_{max}$ of the positive guidance command value settings and the negative guidance command value settings are, as a general rule, set to 0. As a result of this setting, the output target value $P^{ref}$ does not take a positive value. In other words, the load control devices 41a to 41d do not, as a general rule, transmit electrical power from the power load 42 to the power receiving facility C1. In the load control device 41c, however, by setting the maximum output setting value $sv_{max}$ of the negative guidance command value settings to a larger value than 0, as shown in FIG. 5A, it is also possible to ensure that the output target value $P^{ref}$ is a positive value as shown in FIG. 5B. This is because the power load 42 that is controlled by the load control device 41c is provided with a power generation mechanism, thus enabling electrical power to be transmitted from this power load 42 to the power receiving facility C1. For example, in the load control device 41c, the value of the rated output at the time of power generation by the power load 42 (by the power generation mechanism provided therein) that is controlled by the load control device 41c can be set as the maximum output setting value $sv_{max}$ of the negative guidance command value settings.

In the power generation control devices 51a to 51d, as shown in FIG. 6A, the second setting values $sv_2$ of the positive guidance command value settings and the negative guidance command value settings are, as a general rule, set to the fixed value "1". As a result of this setting, in the power generation control devices 51a to 51d, as shown in FIG. 6B, the output target value $P^{ref}$ takes a positive value, when the guidance command value pr is 0. In other words, the power generation control devices 51a to 51d output electrical power generated by the power generator 52 to the power receiving facility C1, when the guidance command value pr is 0. In the power generation control device 51c, however, as shown in FIG. 6A, the second setting value $sv_2$ of the negative guidance command value settings is set to −1, and the minimum output setting value $sv_{min}$ of the negative guidance command value settings is set to 250. As a result of this setting, as shown in FIG. 6B, the output target value $P^{ref}$ changes between 250 kW (minimum output value $P^{min}$) and 300 kW (maximum output value $P^{max}$), with the guidance command value pr close to the minimum value ($-pr^{lmt}$). This is due to taking into consideration operation in which the power generation control device 51c basically operates the connected power generator 52 below capacity, and increases output power in the case where power supply to the power receiving facility C1 is further required. Also, in the power generation control device 51b, as shown in FIG. 6A, the first setting value $sv_1$ of the positive guidance command value settings is set to a value between 0 and 1. As a result of this setting, as shown in FIG. 6B, the output target value $P^{ref}$ does not take 0, even when the guidance command value pr is the maximum value ($pr^{lmt}$). For example, in the case where a power generator 52 that must continuously output (generate) power at a predetermined wattage or more is connected, a value between 0 and 1 is set in this way as the first setting value $sv_1$ of the positive guidance command value settings.

As mentioned above, with each power control device B1, the point shown next is adjusted depending on the setting values that are set, and adjusted to change characteristics that depend on the power control device B1. This means that the following are adjusted: the value of the output target value $P^{ref}$ when the guidance command value pr is the minimum value ($-pr^{lmt}$), the value of the output target value $P^{ref}$ when the guidance command value pr is the maximum value ($pr^{lmt}$), the range (invariable range) of the guidance command values pr in which the value of the output target value $P^{ref}$ does not change even when the guidance command value pr changes, the range (variable range) of the guidance command value pr in which the value of the output target value $P^{ref}$ changes according to the change in the guidance command value pr, the amount of change of the output target value $P^{ref}$ in the variable range, the value of the guidance command value pr at the boundary between the invariable range and the variable range, the value of the guidance command value pr when the value of the output target value $P^{ref}$ changes from a positive value to a negative value (i.e., when the output target value $P^{ref}$ is 0 kW), and the like. In particular, it is evident that the amount of change of the output target value $P^{ref}$ in the variable range (slope of characteristic line) changes, by changing the setting value (first setting value $sv_1$) substituted for the first parameter $a_1$ (for reference, compare solar PCSs 11a and 11c in FIG. 2). Also, it is evident that the value of the output target value $P^{ref}$ where the guidance command value pr is close to 0 changes, by changing the setting value (second setting value $sv_2$) that is substituted for second parameter $a_2$ (for reference, compare FIGS. 2 to 6). Furthermore, it is evident that the value of the guidance command value pr at the boundary between the invariable range and the variable range (guidance command value pr at which the output target value $P^{ref}$ begins to change) changes, by changing the setting value (third setting value $sv_3$) that is substituted for third parameter $a_3$ (for reference, compare solar PCSs 11a and 11b in FIG. 2).

The operation and effect of the power system S1 of this disclosure are as follows.

According to the power system S1, each power control device B1 calculates an output target value of the control target, based on an optimization problem that uses a guidance command value. This optimization problem includes an evaluation function. The evaluation function is common to the plurality of power control devices B1. For example, in the power system described in Document 1, different evaluation functions are set for a solar PCS and a storage battery PCS. Also, in this power system, when introducing a power device (power control device) that controls a different type of control target from a solar cell and a storage battery, an optimization problem (evaluation function) that corresponds to the type of control target needs to be considered. On the other hand, in the power system S1, a common evaluation function is used for the solar PCS 11 and the storage battery PCS 21. Furthermore, in the power system S1, the evaluation function common to the solar PCS 11 and the storage battery PCS 21 is also used for the EV stand 31, the load control device 41 and the power generation control device 51. According to this configuration, an optimization problem (evaluation function) that corresponds to the control target that is controlled by the power control device B1 does not need to be considered for each of the plurality of power control devices. Accordingly, even in the case of controlling different types of control targets with a plurality of power control devices B1, an evaluation function common to the power control devices B1 need only be used, thus enabling the power system S1 to also readily respond to addition of a power control device B1. In other words, the power system S1 is able to respond to diversification of the power control devices B1 (power devices).

According to the power system S1, the evaluation function that is used by the power control devices B1 include a first parameter that is substituted for a first setting value, a second parameter that is substituted for a second setting value, and a third parameter that is substituted for a third setting value. These first, second and third setting values are set for each of the plurality of power control devices B1. As a result of these setting values, in each power control device B1, the change characteristics (refer to FIGS. 2B to 6B) of the output target value relative to a change in the guidance command value can be adjusted. According to this configuration, diverse output requests of users can also be flexibly addressed with the first setting value, the second setting value and the third setting value, even in the case where the evaluation function that is set is common to the power control devices B1.

According to the power system S1, the first setting value, the second setting value and the third setting value can each be set to respectfully different values between the case where the guidance command value is a positive value and the case where the guidance command value is a negative value.

According to this configuration, the change characteristics (refer to FIGS. 2B to 6B) of the output target value relative to a change in the guidance command value can be adjusted as appropriate, between the case where the guidance command value is positive (positive guidance command value settings) and negative (negative guidance command value settings). Accordingly, even in the case where the evaluation function that is set is common to the power control devices B1, diverse output requests of users can be flexibly addressed with the first setting value, the second setting value and the third setting value in the case where the guidance command value is positive (positive guidance command value settings) and in the case where the guidance command value is negative (negative guidance command value settings).

According to the power system S1, each power control device B1 calculates the output target value with the computational equations showing in the above equations (17) and (18) that are derived from the evaluation function shown in the above equations (13) and (14). According to this configuration, the output target value can be calculated by the computations of the above equations (17) and (18), without solving the evaluation function (minimization problem) shown in the above equations (13) and (14), thus enabling the computational load of the power control devices B1 to be reduced.

According to the power control devices B1, the output target value may be calculated, based on the evaluation function of the optimization problem shown in the above equations (13) and (14). The above equations (13) and (14) do not include parameters unique to the control target of each power control device B1. According to this configuration, the power control devices B1 are able to calculate the output target value based on the above equations (13) and (14), even when the types of control targets differ. Accordingly, the power control devices B1 are able to enable energy management that responds to diversification of the power control devices B1 to be realized in the power system S1.

The power system and the power control device according to this disclosure are not limited to the above embodiment. The specific configuration of the power system and the units of the power control device can be freely designed and changed.

The invention claimed is:

1. A power system for controlling a connection point power at a connection point with a power grid, the power system comprising:
   a processing device configured to calculate a guidance command value for controlling the connection point power to achieve a target power; and
   a plurality of power control devices each configured to control an output power of mutually different types of control targets, based on the guidance command value input from the processing device and common to the plurality of power control devices,
   wherein each of the plurality of power control devices calculates a target value of the output power, based on an optimization problem including a common evaluation function, and
   the evaluation function includes the guidance command value and a design parameter for which a setting value set for each of the plurality of power control devices is substituted,
   wherein the design parameter includes a first parameter, a second parameter, and a third parameter,
   the first parameter is a parameter for adjusting an amount of change of the output power that depends on a change in the guidance command value, and a first setting value is substituted therefor,
   the second parameter is a parameter for adjusting the output power in a case where the guidance command value is a value close to 0, and a second setting value is substituted therefor, and
   the third parameter is a parameter for adjusting the guidance command value at which the output power begins to change, and a third setting value is substituted therefor,
   wherein each of the plurality of power control devices calculates the target value, by computing the following equations (1) and (2) derived from the evaluation function:

$$P^{ref} = \left(-\Lambda \frac{a_1}{a_4} \frac{1}{pr^{lmt}} + a_2\right) a_3 \quad (1)$$

$$\Lambda = pr - (1-a_4)\frac{a_2}{a_1} pr^{lmt} \quad (2)$$

where $P^{ref}$ is the target value, pr is the guidance command value $pr^{lmt}$ is a guidance command value limit which is a value defining a maximum value and a minimum value of the guidance command value pr, $a_1$ is the first parameter, $a_2$ is the second parameter, $a_3$ is the third parameter, and $a_4$ is a parameter that depends on a charging rate of a storage battery.

2. The power system according to claim 1, wherein the first setting value, the second setting value and the third setting value are each set separately between a case where the guidance command value is a positive value and a case where the guidance command value is a negative value.

3. A power control device, in a power system that controls a connection point power at a connection point with a power grid, for receiving input of a guidance command value for controlling the connection point power to achieve a target power, and controlling output power, based on the guidance command value, the power control device calculating a target value of the output power, based on an evaluation function of an optimization problem defined by the following equations (3) and (4):

$$\min_{p^{ref}} \left\{ \frac{pr^{lmt}}{2a_3} \cdot \frac{a_4}{a_1} (P^{ref} - a_2 a_3)^2 + \Lambda(P^{ref} - a_2 a_3) \right\} \quad (3)$$

$$\Lambda = pr - (1 - a_4)\frac{a_2}{a_1} pr^{lmt} \quad (4)$$

where $P^{ref}$ is the target value, pr is the guidance command value, $pr^{lmt}$ is a guidance command value limit which is a value defining a maximum value and a minimum value of the guidance command value pr, $a_1$, $a_2$ and $a_3$ are design parameters for which a setting value set for each of the power control devices is substituted, and $a_4$ is a parameter that depends on a charging rate of a storage battery.

* * * * *